Dec. 28, 1926.  
E. J. G. PHILLIPS  
TROLLEY TRACK  
Filed Feb. 7, 1925  
1,612,216  
2 Sheets-Sheet 1
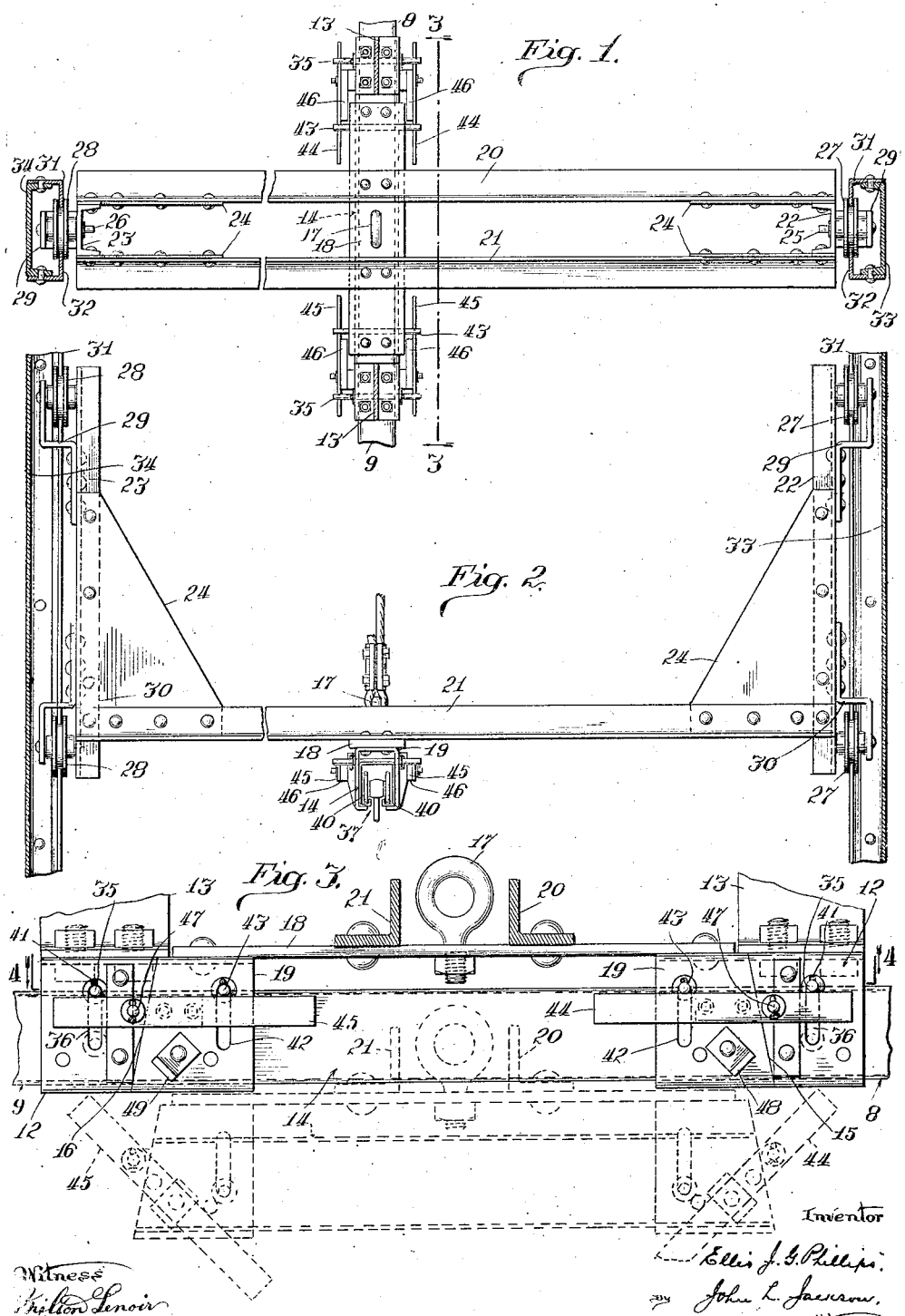

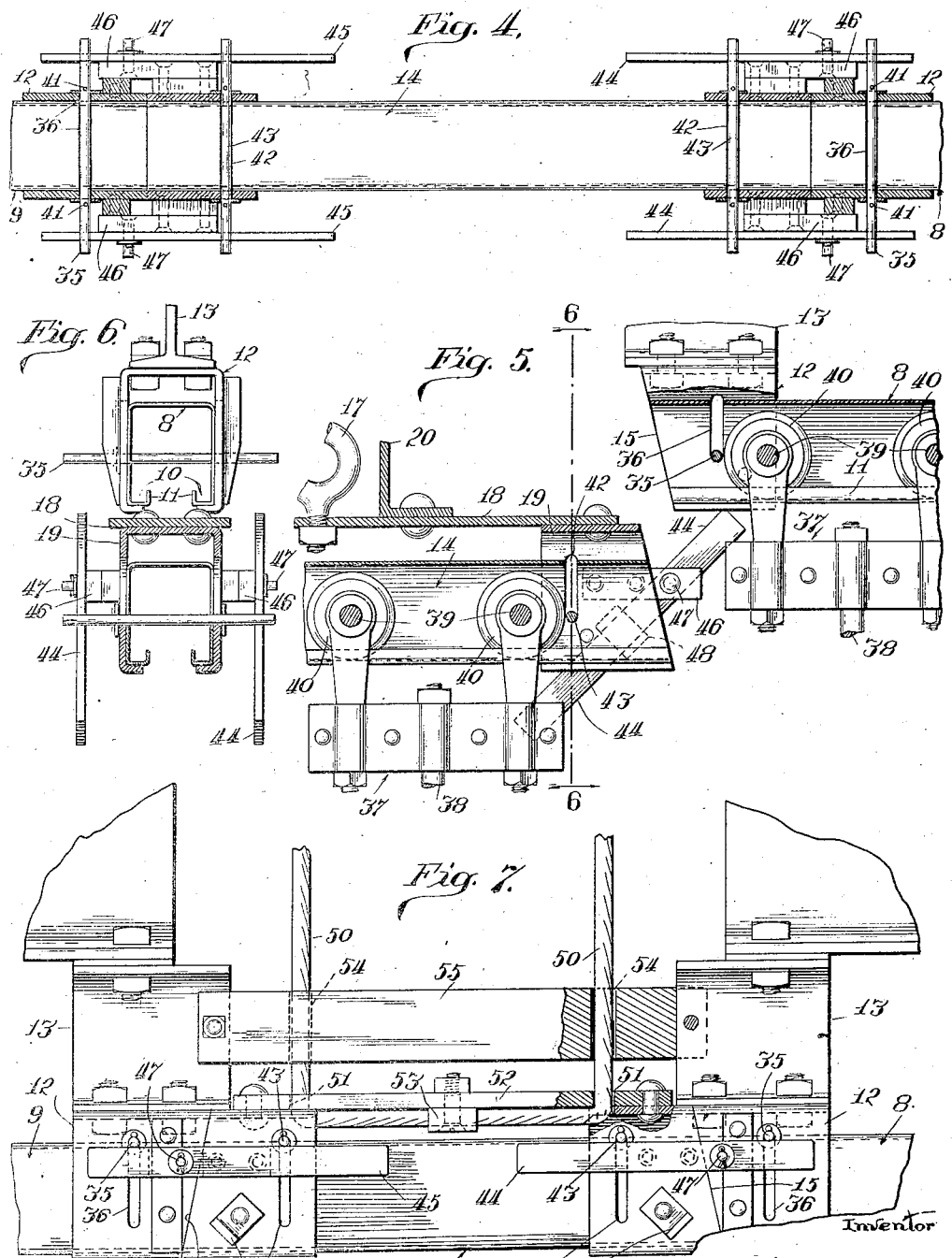

Patented Dec. 28, 1926.

1,612,216

UNITED STATES PATENT OFFICE.

ELLIS J. G. PHILLIPS, OF AURORA, ILLINOIS, ASSIGNOR TO RICHARDS-WILCOX MANUFACTURING COMPANY, OF AURORA, ILLINOIS, A CORPORATION OF ILLINOIS.

TROLLEY TRACK.

Application filed February 7, 1925. Serial No. 7,613.

My invention relates to trolley apparatus of the same general type as that shown and described in my application of even date herewith for improvements in trolley apparatus, Serial No. 7,614, comprising stationary track sections and a movable track section that may be raised or lowered into or out of operative relation to the stationary track sections so that a trolley may be run from one of the stationary track sections on to the movable track section and then be lowered to permit its load to be operated upon, as for example, by dripping it into a paint containing tank, after which the movable track section and the trolley carried by it, with or without its load, may be restored to its operative relation to the stationary track section. My said application has to do generically with the provision of safety devices in the form of stops associated with the stationary, and also with the movable, track sections, and operating automatically to block the several track sections when they are not in operative relation to each other to prevent the trolley or trolleys from accidentally running off of them, and in said application the invention thereof is shown and described as applied to a trolley track of the I-beam type in connection with which U-shaped trolleys are used. My present invention has to do more particularly with trolley tracks of the inverted U-shape type with which T-shaped trolleys are used, that is to say, trolleys comprising one or more pairs of parallel rollers connected by a suitable frame and having a depending hanger that moves in the gap between the parallel rails of the track on which the rollers run. It has for its object to provide a track of this type with a vertically movable track section for the purposes above indicated, and equipped with safety devices that will automatically move into position to safeguard the end portions of the movable track section when it is lowered out of its operative relation to the stationary track sections, and also to provide similarly functioning safety devices to guard or block the end portions of the stationary track sections at opposite sides of the gap left by the movable track section when it is lowered; also to provide improved means for guiding the movable track section so that it will register properly with the stationary track sections when moved into its operative position, and will be held against lateral swinging when it is raised or lowered. I accomplish this object as illustrated in the accompanying drawings and hereinafter described. What I regard as new is set forth in the claims.

In the accompanying drawings,—

Fig. 1 is a plan view partly broken away, showing such parts of a trolley track as are necessary to an understanding of my invention, some parts being shown in horizontal section;

Fig. 2 is a side elevation of the parts shown in Fig. 1, except that the guides are shown in vertical section;

Fig. 3 is an enlarged detail, being a vertical section on line 3—3 of Fig. 1;

Fig. 4 is a horizontal section on line 4—4 of Fig. 3;

Fig. 5 is a partial central longitudinal vertical section of the track showing the movable section lowered from its operative position, with trolleys mounted on the stationary track section and also on the movable track section;

Fig. 6 is a vertical cross-section on line 6—6 of Fig. 5; and

Fig. 7 is a side elevation, partly in section, showing a modification, the movable track section being shown in operative relation with the stationary track sections.

Referring to the drawings,—8, 9 indicate stationary track sections of the inverted U-shape type, best illustrated in Fig. 6. Such track sections are usually made by bending a piece of sheet metal to U-shape in cross-section and turning the margins thereof inward and upward to form parallel channels or treads 10 with a longitudinal gap 11 between them. These stationary track sections are supported in any suitable way, as by brackets 12 secured to overhead I-beams 13.

The two stationary track sections 8, 9 are supported preferably in the manner described, so that they aline with each other, but are separated by a gap adapted to receive a movable track section 14 of similar design that, when in operative position, alines with the stationary track sections and forms a continuation thereof. As best shown at 15, 16 in Figs. 3 and 7, the adjoining end portions of the stationary track sections are inclined so that they diverge downwardly, and the opposite end portions of the movable track section 14 are correspondingly inclined so that the latter track section can drop readily out of engagement with the stationary track sections, and when raised is guided endwise into its proper position by the co-action of such inclined surfaces, should it be slightly out of such position.

In the arrangement shown in Figs. 1 to 6, the movable track section 14 is provided with an eye 17 located centrally at its upper side and secured to a plate 18 that is provided at its ends with brackets 19 similar in construction to the brackets 12 by which the stationary track sections are supported. Said plate and the end brackets 19 thereof constitute a frame that supports the movable track section, and sustains the weight of the load carried by it. By connecting the hoisting cable to the eye 17 the movable track section 14 may readily be raised or lowered. For guiding it when it is so moved so that it cannot swing either laterally or endwise, and will always register properly with the stationary track sections when raised to its operative position, I provide a guiding frame, preferably composed of a pair of parallel angle bars 20, 21 that extend transversely of the plate 18 and are fixedly secured thereto at opposite sides of the central portion thereof, as shown in Figs. 1 and 3. Said bars are connected together at their ends by channel bars 22, 23, that are perpendicularly disposed relatively to said angle bars 20, 21 and rise some little distance above them, as shown in Fig. 2. Gusset plates 24 serve to brace said parts together so that the channel bars are firmly held in position. Near their upper and lower ends the channel bars 22, 23 are provided with outwardly projecting pivot pins 25, 26 on which are mounted guide rollers 27, 28, the outer ends of said pins being preferably braced by straps 29, 30, as shown in Fig. 2, so that said rollers are held in proper position. In the construction shown the rollers 27, 28 are grooved and are adapted to run between parallel rails 31, 32 secured to vertically-disposed channel bars 33, 34 at opposite ends of the angle bars 20, 21, as shown in Figs. 1 and 2. By this construction the angle bars 20, 21 are held against lateral and endwise movement by the guiding means at the end portions thereof, but they may move freely vertically; and thereby the movable track section 14 is also guided as it is raised or lowered. Furthermore, said movable track section cannot tip endwise because the upper and lower rollers at each end of the frame that support said track section prevent tipping thereof.

The end portions of the stationary track sections at the opposite ends of the movable track sections are blocked, to prevent trolleys thereon from accidentally running off at the gap left by the lowering of the movable track section, by means of transverse rods 35 fitted in vertical slots 36 in the stationary track sections, as shown in Figs. 3 and 5. Where the brackets 12 overlie said slots they are also provided with similar slots that register with the slots 36, and this is the preferable arrangement, since in that way said brackets reenforce the slottted portions of the track sections. In Fig. 5 I have illustrated a trolley in position on the stationary track section 8, said trolley being indicated generally by the reference numeral 37, 38 being the member for attaching a load thereto. As shown in said figure, the slot 36 extends down from the top of said track section to a point slightly below the axis 39 of the trolley wheels 40 so that when the rod or stop 35 rests at the lower ends of the slots 36 at opposite sides of the track section it will be in position to intercept the wheels of a trolley on said track section, and as it will be below the axis of the trolley wheels said wheels will not tend to thrust it upward out of operative position, but, on the contrary, will tend to hold it down. Said rod may, however, be lifted high enough so that the trolley wheels can pass under it, and this is automatically done when the movable track section is restored to operative relation with the stationary track sections, as will be hereinafter described. As shown in Fig. 4, the rods 36 are considerably longer than the track sections are wide so that the ends of said rods project somewhat beyond both sides of the stationary track section. For preventing endwise movement of said rods they are provided with cotter pins 41 at opposite sides of the track section, as shown in Fig. 4.

The movable track section is provided adjacent to its ends with vertical slots 42, similar to the slots 36, and with rods or stops 43 that are similar to the rods 36. The purpose of the rods 43 is to block the ends of the movable track section 14 to prevent the trolley thereon from running off when said movable track section is lowered from its normal position.

For controlling the position of the several rods or stops 36, 43 so that said stops will automatically move into operative position when the movable track section is lowered, and will be automatically moved out of operative position when said movable track section is restored to its normal relation to the stationary track sections, the movable track section is provided with two pairs of vertically swinging bars 44, 45 mounted adjacent to the opposite end portions of said track section, the bars of each pair being at opposite sides thereof. As shown in Fig. 5, said bars are pivotally mounted on arms 46 that are secured to the sides of the brackets 19 so that they are adapted to swing vertically about their pivots 47, and said pivots are so located that the inner ends of said bars overbalance the outer ends thereof, and, therefore, said bars tend to assume the position shown in Fig. 5 with their outer ends uppermost. Stops 48, 49 are provided at the sides of the bracket 19 for supporting the inner ends of the bars 44, 45, respectively, so that when the movable track section 14 is lowered said bars will be supported in the inclined position shown. These bars project outward far enough so that they at all times underlie the end portions of the rods 35, and at the same time their inner ends underlie the rods 43.

From the foregoing description it will be understood that when the movable track section 14 is lowered the bars 44, 45 will assume the inclined position shown in Fig. 5, and that the rods 35, 36 and 43 will be at the lower ends of their respective slots, thereby blocking the track sections with which they are associated. When the movable track section is raised high enough the outer ends of the bars 44, 45 will come in contact with the rods 35, 36, and as said movable track section continues its upward movement said rods will be lifted in their respective slots until finally they move out of the way of the path of the wheels of any trolley that may be on the stationary track sections. In the course of this operation the bars 44, 45 will also be rocked on their pivots 47 to raise their inner ends, which will, therefore, engage and lift the rods 43 carried by the movable track section, thereby releasing the trolley thereon. When the movable track section reaches its uppermost or normal position, the bars 44, 45 will assume the horizontal position shown in Fig. 3, and will hold the rods 35, 36 and 43 up out of operative position, but just as soon as the movable track section begins to descend the rods 43 will begin to drop and coincidently therewith, or very shortly thereafter, the rods 35, 36 will also be permitted to drop, until ultimately they reach the ends of their respective slots and block the several track sections. The apparatus, therefore, operates automatically to control the position of the stop rods in accordance with the movement of the movable track section.

In Fig. 7 I have shown the application of my improved safety devices to a trolley track in which the movable track section is supported in a somewhat different manner from that shown in the other figures. In the construction shown in Fig. 7 the movable track section 14 is suspended by a looped cable 50 which passes through holes 51 near the end portions of a plate 52 similar to the plate 18, and is secured to said plate by a clamp 53. The cable also passes through vertical passages 54 in a cross-beam 55, the ends of which are secured to the I-beams 13 which carry the brackets 12. With this arrangement the transverse guides shown in Figs. 1 and 2 may be omitted, as the extended engagement of the cable with the beam 55 in conjunction with the inclined ends of the track sections will suffice to insure proper registration of the movable track section with the stationary track sections when the movable track section is raised to its normal position.

What I claim as my invention and desire to secure by Letters Patent, is—

1. A trolley apparatus comprising an inverted U-shaped stationary track section, a similar vertically movable track section adapted to aline therewith, said stationary track section being fixedly supported up to its point of transfer to said movable track section, and a stop device associated with said stationary track section and movable into and out of operative position by the movement of said movable track section out of or into operative relation to said stationary track section.

2. A trolley apparatus comprising an inverted U-shaped stationary track section, a similar vertically movable track section adapted to aline therewith, said stationary track section being rigidly fixed up to its point of transfer to said movable track section, and a stop device associated with said movable track section and movable into and out of operative position by the movement of said movable track section out of or into operative relation to said stationary track section.

3. A trolley apparatus comprising an inverted U-shaped stationary track section, a similar vertically movable track section adapted to aline therewith, said stationary track section being permanently maintained in a horizontal plane up to its point of transfer to said movable track section, and stop devices associated with said track sections respectively and movable into and out of operative position by the movement of said movable track section out of or into operative relation to said stationary track section.

4. A trolley apparatus comprising a stationary track section, a track section movable vertically into and out of alinement therewith, and a safety stop associated with one of said track sections and actuated by movement of said movable track section to move into or out of operative position, said safety stop comprising a transverse rod movable vertically into or out of position to block the track section with which it is associated.

5. A trolley apparatus comprising an inverted U-shaped stationary track section, a similar vertically movable track section adapted to aline therewith, and a stop device associated with one of said track sections and movable into and out of operative position by the movement of said movable track section out of or into operative relation to said stationary track section, said stop comprising a transverse rod movable vertically in slots in the track section with which it is associated.

6. A trolley apparatus comprising an inverted U-shaped stationary track section, a similar vertically movable track section adapted to aline therewith, one of said track sections having substantially vertical slots at opposite sides thereof, a stop device associated with the latter track section comprising a transverse rod movable in said slots into and out of operative position, and means carried by said movable track section and operated by the movement thereof out of or into operative relation to said stationary track section to move said stop into or out of operative position.

7. A trolley apparatus comprising an inverted U-shaped stationary track section, a similar vertically movable track section adapted to aline therewith, one of said track sections having substantially vertical slots at opposite sides thereof, a stop device associated with the latter track section comprising a transverse rod movable in said slots into and out of operative position, and vertically swinging bars carried by one of said track sections and actuated by movement of said movable track section out of or into operative relation to said stationary track section for moving said stop into or out of operative position.

8. A trolley apparatus comprising an inverted U-shaped stationary track section, a similar vertically movable track section adapted to aline therewith, said track sections having substantially vertical slots at opposite sides thereof, stops associated with said track sections, said stops comprising transverse rods movable vertically in said slots, and vertically-swinging bars carried by said movable track section and operating by the movement thereof out of or into operative relation to said stationary track section to move said stops into or out of operative position.

9. A trolley apparatus comprising a stationary track section, a track section movable vertically into and out of alinement therewith, said stationary track section being rigidly fixed up to its point of transfer to said movable track section, a frame on which said movable track section is mounted, vertical guides for said frame, and stop devices associated with said track sections and actuated by movement of said movable track section out of or into operative relation to said stationary track section, to move into or out of operative position.

10. A trolley apparatus comprising a stationary track section, a track section movable vertically into and out of alinement therewith, said stationary track section being rigidly fixed up to its point of transfer to said movable track section, a frame on which said movable track section is mounted, guides for the end portions of said frame comprising vertically-disposed tracks, and rollers carried by said frame and running on said tracks, and a stop device associated with said track sections and actuated by movement of said movable track section out of or into operative relation to said stationary track section, to move into or out of operative position.

11. A trolley apparatus comprising a stationary track section, a track section movable vertically into and out of alinement therewith, said stationary track section being rigidly fixed up to its point of transfer to said movable track section, a frame on which said movable track section is mounted, guides for the end portions of said frame comprising vertically-disposed tracks, and vertically spaced pairs of rollers mounted on said frame and running on said tracks, and a stop device associated with said track sections and actuated by movement of said movable track section out of or into operative relation to said stationary track section, to move into or out of operative position.

12. A trolley apparatus comprising a stationary track section having a longitudinal slot in the bottom thereof through which is adapted to extend the depending portion of the trolley, a similar vertically movable track section adapted to aline therewith, said stationary track section being rigidly fixed up to its point of transfer to said movable track section, and a stop device associated with one of said track sections and movable into and out of operative position by the movement of said movable track section out of or into operation relation to said stationary track section.

13. A trolley apparatus comprising a stationary track section, a movable track section adapted to aline therewith, a vertically swinging bar pivotally supported on one of said track sections and having arms extending to each side of its pivot, and stops associated with said stationary track section and with said movable track section and operated by the arms of said bar as said movable track section moves into operative relation to said stationary track section.

ELLIS J. G. PHILLIPS.